United States Patent [19]
Yamada et al.

[11] Patent Number: 5,467,265
[45] Date of Patent: Nov. 14, 1995

[54] PLANT OPERATION METHOD AND PLANT OPERATION CONTROL SYSTEM

[75] Inventors: Akihiro Yamada, Hitachi; Makoto Shimoda, Katsuta; Masaji Nakahara; Masahiro Yoshioka, both of Hitachi, all of Japan

[73] Assignee: Hitachi, Ltd., Tokyo, Japan

[21] Appl. No.: 194,520

[22] Filed: Feb. 10, 1994

[30] Foreign Application Priority Data

Feb. 10, 1993 [JP] Japan .................................. 5-022361

[51] Int. Cl.[6] ............................ G05B 13/02; G06F 19/00
[52] U.S. Cl. .......................... 364/154; 364/148; 364/492; 395/11; 395/907
[58] Field of Search ................... 364/130–194, 364/492–495; 395/11, 903, 904, 906, 907, 912, 914, 915, 919

[56] References Cited

U.S. PATENT DOCUMENTS

| | | | |
|---|---|---|---|
| 4,835,690 | 5/1989 | Gangarosa et al. | 395/924 |
| 4,868,754 | 9/1989 | Matsumoto | 364/150 X |
| 5,051,932 | 9/1991 | Inoue et al. | 364/550 |
| 5,053,970 | 10/1991 | Kurihara et al. | 395/904 X |
| 5,305,230 | 4/1994 | Matsumoto et al. | 395/906 X |

FOREIGN PATENT DOCUMENTS

| | | |
|---|---|---|
| 61-97703 | 5/1986 | Japan . |
| 63-302318 | 12/1988 | Japan . |
| 64-76360 | 3/1989 | Japan . |
| 4-93558 | 3/1992 | Japan . |

OTHER PUBLICATIONS

"Neurocomputer Foundations of Research", the MIT Press, 1988, pp. 675–695.

"Optimization of Cogeneration"—Itoh et al—pp. 45–63—published by Sangyo Tosho K.K.; 1990.

Knight et al—"The Use of Expert Systems in Industrial Control"—Measurement and Control, vol. 17, Dec./Jan.–1984–85, pp. 409–413.

Primary Examiner—Joseph Ruggiero
Attorney, Agent, or Firm—Antonelli, Terry, Stout & Kraus

[57] ABSTRACT

A system for determining a cost effective and practical operation method for thermal source equipments includes a fundamental plan data storage unit, a fundamental plan generating unit for determining a fundamental operation plan of each equipment while minimizing an operation cost by linear programming, an operation knowledge storage unit for storing operation knowledge such as equipment performance characteristics and operation know-how, a fundamental plan evaluating unit for evaluating the fundamental plan, a modifying rule storage unit for storing modifying rules used for modifying the evaluated fundamental plan, and a fundamental plan modifying unit for modifying the fundamental plan in accordance with the modifying rules.

16 Claims, 11 Drawing Sheets t1: STOP TIME DURATION (STOP SECTION A)
t2: CONTINUOUS RUNNING DURATION
h: LOAD FACTOR AT TIME B

EXPLANATION FOR REFERENCE VALUES

| t1 | S | | | | | | L | |
|---|---|---|---|---|---|---|---|---|
| t2 | S | | L | | S | | L | |
| h | S | L | S | L | S | L | S | L |
| A~B | OFF | ON | ON | | OFF | | OFF | |
| B~C | OFF | ON | ON | | OFF | | ON | |

S: LOWER THAN REFERENCE VALUE
L: HIGHER THAN REFERENCE VALUE
ON : START
OFF : STOP

OPERATION SMOOTHING RULES

EXAMPLE OF STARTUP CHARACTERISTICS

STARTUP CHARACTERISTIC MODEL

EXAMPLE OF SHUTDOWN CHARACTERISTICS

SHUTDOWN CHARACTERISTIC MODEL

FIG.12

| MENU | GRAPHICAL REPRESENTATION | NUMERICAL REPRESENTATION | | | | |
|---|---|---|---|---|---|---|
| EQUIPMENT NAME | TIME | | | | | |
| | 0 | 6 | 12 | | 18 | 24 |
| BOILER NO.1 | 20 | ----- | 80 | 100 | ----- | 20 | 23 |
| BOILER NO.2 | 0 | ----- | 0 | 0 | ----- | 0 | 0 |
| REFRIGERATOR NO.1 | 0 | ----- | 78 | 92 | ----- | 0 | 0 |
| REFRIGERATOR NO.2 | | | | | | |
| REFRIGERATOR NO.3 | | | | | | |

LOAD FACTOR (%)

PLANT OPERATION METHOD AND PLANT OPERATION CONTROL SYSTEM

BACKGROUND OF THE INVENTION

The present invention relates to a plant operation method and a plant operation control system having a plurality of different type equipments. More particularly, the invention relates to such a method and system suitable for district heating and cooling systems, cogeneration systems, fuel cell systems, and other systems.

For example, the following conventional techniques are known as an optimal operation method for equipments.

(1) JP-A-61-97703 (hereinafter called a conventional technique 1).

(2) "Optimization of Cogeneration", by Kouich ITOH and Ryouhei YOKOYAMA, issued by Sangyo Tosho K.K., pp. 45–63 (hereinafter called a conventional technique 2).

(3) JP-A-4-93558, "Operation Control System for Refrigerators (hereinafter called a conventional technique 3).

The conventional technique (2) is concerned with an operation method for a cogeneration plant constituted by equipments such as generators, boilers, and refrigerators. With this method, an operation efficiency of each equipment is formulated by linear programming, and a schedule of a start/stop state and a schedule of output level of each thermal source equipment are determined by linear programming while minimizing an operation cost which is used as the objective function.

The conventional technique (1) is concerned about an operational planning method for a plurality of thermal source equipments. With this method, combinations of equipments are selected which can be realized from the viewpoint of equipment connections. The operation period is divided into a predetermined number of small periods in accordance with the operation conditions such as equipment inspection states. The sum of operation cost and start/stop cost of the combination of equipments at each divided small period is calculated, and a predetermined number of combinations starting from the combination which has the minimum sum, are selected as the solutions of shortest path problems.

The conventional technique (1) is cost effective because the optimum solution can be obtained mathematically. With the second conventional technique (2), practical combinations are predetermined based upon various conditions. Therefore, the number of combinations is small, thereby reducing a calculation amount (time). However, both the conventional techniques (1) and (2) aim at minimizing the operation cost, and do not consider the life of equipment (reliability), an irregular change in equipment performance characteristics at the start/stop, and the like.

A conventional technique (3) is also known in which a start/stop schedule of each equipment is determined while considering the life time of the equipment.

According to the conventional technique (3), the occurrence frequency of starts and stops of a compressor of a refrigerator is measured. Each time when the occurrence frequency of starts and stops exceeds a predetermined occurrence frequency, the re-start inhibition time period of the compressor and the stop inhibition time period after a start are made longer than initial values.

The equipment reliability is improved by reducing the start/stop occurrence frequency. However, the conventional technique (3) regulates only the start/stop occurrence frequency of a single equipment, and does not determine an operation by considering equipment performance characteristics, continuous running state, influences to other equipments, and the like.

As an optimal operation method by which an operation method of thermal equipments are determined from given future demands, there is known a method of formulating performances such as efficiencies of equipments and economically determining an operation method through mathematical programming by using as the objective function an operation cost such as a consumed fuel (electricity) charge.

In order to obtain a practical operation method, it is necessary to consider also the life of equipment (reliability), irregular equipment performance characteristics at the start and stop, and the like.

Generally, it is necessary to reduce the number of start/stop times of a thermal source equipment such as a boiler, generator, and refrigerator as many as possible because the equipment has a large heat capacity and because the lifetime of the equipment is adversely affected by thermal stress and temperature change at the start/stop which may result in deterioration of electric insulating materials.

The conventional techniques determine start/stop schedules at each operating time period which minimizes the energy consumption cost of thermal equipments. Therefore, the combination of equipments changes with demands which change with time, resulting in an intermittent operation having a number of start/stop states. As a method of reducing the number of start/stop states by optimization through linear programming, it is known that a cost required for start/stop is determined and added to the objective function. With this method, although the number of start/stop states can be reduced, combinations of equipments are determined without considering past and future operation conditions, being unable to obtain a practical solution. Although dynamic programming determines an optimum solution by considering past and future operation conditions, dynamic programming requires a tremendous calculation time as compared with the linear programming. Dynamic programming is therefore difficult to-be used practically.

With conventional mathematical programming, the number of parameters to be processed becomes great if important equipment operation conditions such as equipment life times and equipment output response characteristics, are to be taken into consideration, or it becomes necessary to use dynamic programming which requires a very long calculation time. In the case of a large scale and complicated equipment configuration, particularly in the case of a district heating and cooling system, a calculation time increases greatly so that dynamic programming is not practical, As a result, conventional optimization through mathematical programming is difficult to consider necessary operation conditions such as equipment life times and equipment output response characteristics. Accordingly, an actual equipment operation has been conventionally relied upon intuition and experience of a skilled operator in many cases. Optimization by the decision of an operator is however unreliable, and the decision differs from one operator to another. Furthermore, a need of an automatic operation has been strongly desired because the number of available operators tends to be insufficient.

SUMMARY OF THE INVENTION

It is an object of the present invention to provide a plant operation scheduling method capable of generating an optimal and practical operation schedule which optimizes a given objective function such as an operation cost.

According to one aspect of the present invention, an operation fundamental plan of a plant constituted by a plurality of different type equipments is generated by mathematical programming, and the generated fundamental plan is modified by using predetermined knowledge rules in order not to present practical contradiction, Specifically, the relationship between input/output of each equipment constituting the plant is formulated, and an operation fundamental plan is generated by calculating inputs at each operating hour which inputs satisfy the target output of the plant and obtain a minimum or maximum value of a predetermined objective function. The operation fundamental plan is modified by using knowledge rules regarding the equipment performance characteristics not considered by linear programming.

In this specification, a term "plant" is intended to mean a plant constituted by a plurality of different type equipments, such as district heating and cooling systems or cogeneration systems constituted by, for example, generators, boilers, refrigerators, fuel cell systems, and various production systems. A predetermined objective function may be an energy cost, an exhaust amount of toxic gas into air, or the number of manufacture sets, the objective function being not limited to one of them.

According to another aspect of the present invention achieving the above object, a plant operation control system is provided in which an operation method for a plurality of different type equipments during a predetermined period is determined. The plant operation control system includes means for generating a fundamental operation plan through linear programming for the purpose of minimizing only an operation cost, i.e., an energy cost, and means for modifying the fundamental operation plan through an AI approach by using knowledge rules regarding a life time of each equipment, a response time characteristic of an equipment output, a time sequential relationship between operation conditions, and other operation know-how.

A fundamental plan is obtained in a short time by using linear programming, which plan minimizes a running cost, i.e., energy consumption cost, and then knowledge engineering is used to modify the operation fundamental plan. Accordingly, as compared with dynamic programming, the number of iterative calculations can be reduced greatly, resulting in a high speed solution.

Use of knowledge engineering facilitates to process conditions which are difficult to be formulated. Conditions difficult to be formulated can be processed by using fuzzy inference, and operator know-how and the like whose cause and effect are indefinite can be processed by using learning and inference abilities of a neural network. These processes can be performed in a shorter time as compared with dynamic programming.

According to the present invention, therefore, economical performance can be ensured by linear programming, and know-how of skilled operators can be reflected upon by using an AI approach. It is therefore possible to obtain a practical operation method at high speed while considering an energy cost.

A computer work scheduling system is known disclosed in JP-A-63-76360 which uses knowledge engineering for work allocation and mathematical programming for allocation calculation. This technique is quite different from the present invention in its combination and object.

BRIEF DESCRIPTION OF THE DRAWINGS

FIG. 12 shows an example of a display screen showing the results of a planned schedule.

DESCRIPTION OF THE PREFERRED EMBODIMENTS

Figure 1:
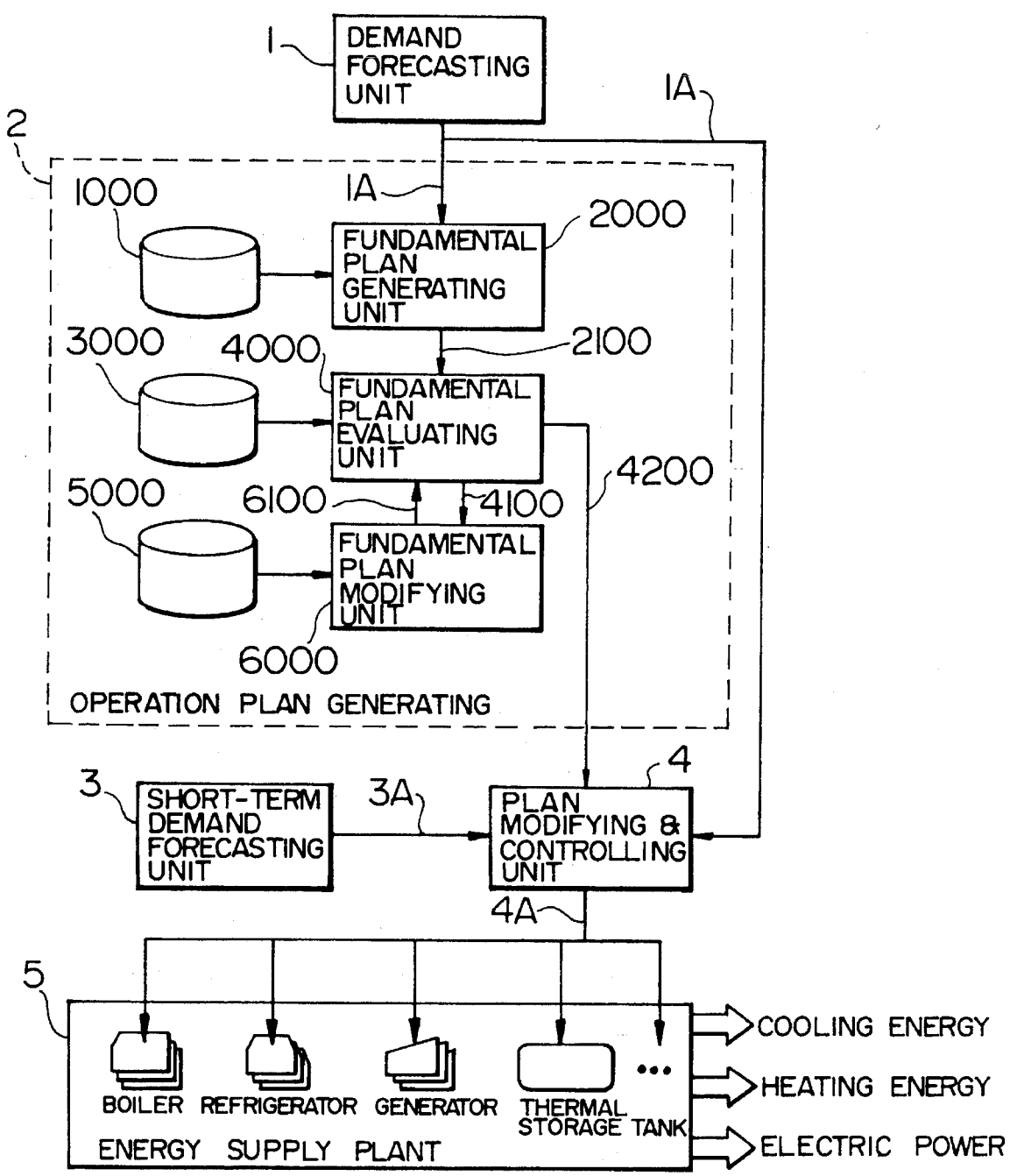
FIG. 1 is a schematic diagram illustrating an embodiment of the present invention.

FIG. 1 illustrates an embodiment of the present invention.

A next day demand forecasting means 1 forecasts a next day output (hereinafter called demand) of an energy supply plant 5 during each predetermined time period, for example, during each one hour. The forecast results are sent to an operation plan generating means 2 of the present invention at which an operation plan 4200 for each hour of each equipment of the plant 5 is generated.

On the operation day, an operation day demand forecasting means or short term demand forecasting means 3 forecasts a demand during a relatively short term, for example, during each time period of 15 minutes in two hours. The short term demand forecasting means 3 forecasts a demand basing upon data such as temperature and humidity on the operation day which is more correct and detailed than the data forecast on the day before the operation day. Accordingly, the short term demand forecasting means 3 can forecast a demand which is more detailed and precise than the forecast results by the next day demand forecasting means 1.

A plan modifying and controlling means 4 modifies the operation plan 4200 generated from next day forecast results 1A obtained on the day before the operation day, in accordance with more correct operation day forecast results 3A. The modified plan is used for generating control signals for equipments of the energy supply plant 5. The control signals control the start, stop, and load factor of each equipment. In modifying the operation plan, a demand tendency after the forecast time period (e.g., after two hours) by the operation day demand forecasting means 3 is also taken into consideration by referring to the operation day forecast results 1A.

The forecast interval and duration by the next day demand forecasting means 1 and operation day forecasting means 3 are not limited to the above examples.

Next, the operation plan generating means 2 will be described in detail.

The operation plan generating means 2 of the invention includes at least a fundamental plan data storage means 1000, a fundamental plan generating means 2000, an operation knowledge storage means 3000, a fundamental plan evaluating means 4000, a modifying rule storage means 5000, and a fundamental plan modifying means 6000. The operation plan generating means 2 generates a start/stop schedule and a running load factor schedule of each thermal source equipment.

The fundamental plan generating means 2000 determines the start/stop schedule and running load factor schedule of each thermal source equipment every one hour by linear programming, which schedules satisfy a necessary output (hereinafter called demand) of each equipment corresponding to the energy demand changing with time and minimize an energy consumption cost of each equipment.

Necessary data to be used by the fundamental plan generating means 2000 is being stored in the fundamental plan data storage unit 1000, the necessary data including equipment configuration data, equipment input/output relation data, equipment upper and lower input bounds data, equipment upper and lower output bounds data, input energy unit cost data, and other data.

A fundamental plan 2100 generated by the fundamental plan generating means 2000 is sent to the plan evaluating means 4000 which evaluates the appropriateness of the fundamental plan. This evaluation of appropriateness is performed by taking into consideration influence to an equipment life time, equipment dynamic characteristics, and the like which were not considered by the fundamental plan generating means 2000 and are being stored in the operation knowledge storage means 3000.

If the evaluation results indicate that the fundamental plan is required to be modified, this plan 4100 is sent to the fundamental plan modifying means 6000 and modified in accordance with rules stored in the modifying rule storage means 5000, If modification is not necessary, the fundamental rule is outputted as an operation plan 4200.

A fundamental plan 6100 modified by the fundamental plan modifying means 6000 is returned back to the plan evaluating means 4000 and is again subjected to the processes described above.

The embodiment of the present invention will be described more particularly. In this embodiment, the start/stop schedule and running load factor schedule of each equipment constituting the energy supply plant are determined every one hour in units of a day.

Figure 2:
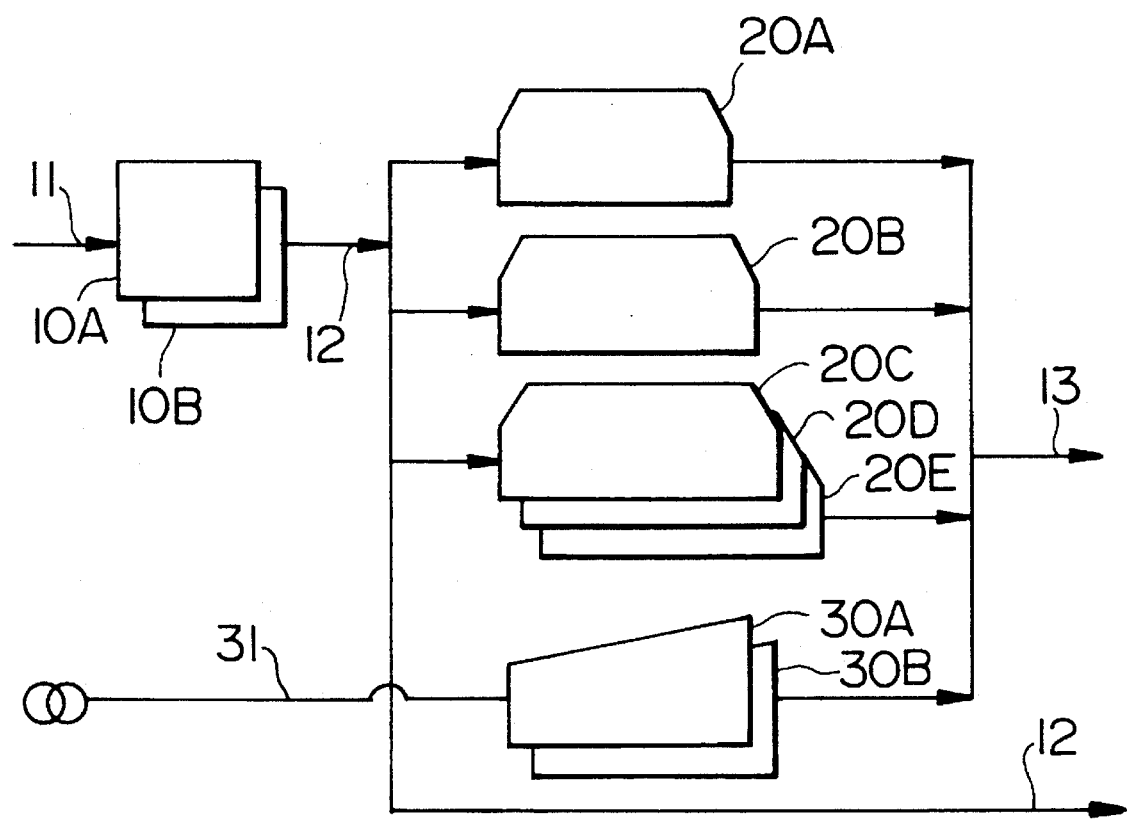
FIG. 2 is a schematic diagram showing an example of the structure of an energy supply plant.

An example of the structure of the energy supply plant 5 is shown in FIG. 2. This plant has gas-fired boilers 10A and 10B having the same capacity for outputting steam 12 by using gas 11 as its fuel, steam absorption refrigerators 20A, 20B, 20C, 20D, and 20E for outputting cooling energy 13 by using the steam 12 supplied from the boilers as their driving thermal source, and electric compression refrigerators 30A and 30B. This plant supplies cooling energy 13 and heating energy (steam) 12. The refrigerators 20C to 20E, 30A nd 30B have the same capacity.

Figure 3:
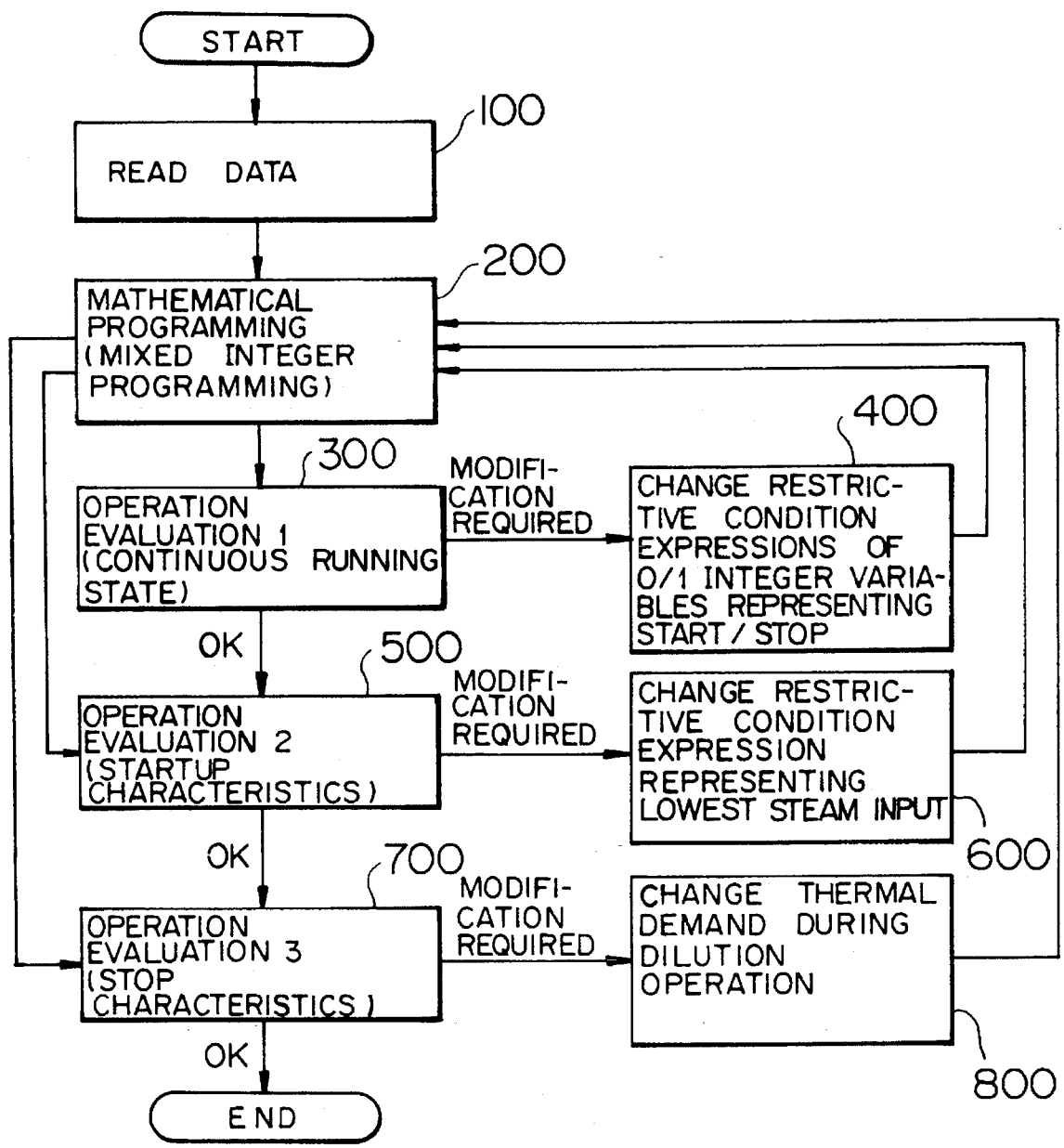
FIG. 3 is a flow chart explaining an algorithm used by the embodiment.

FIG. 3 illustrates an algorithm to be performed by the operation plan generating means 2. The details of the embodiment will be given with reference to Steps of the algorithm.

[1] Step 100

The fundamental plan generating means 2000 reads data from the fundamental plan data storage means (database) 1000, or data is externally inputted to and stored in the fundamental plan generating means 2000. The data includes equipment configuration data, equipment rated capacity data, equipment input/output relation data, equipment upper and lower input bounds data, demands data for heating and cooling energies every one hours in each day, unit cost data of energy charges of gas and electricity.

[2] Step 200

By using the data, the fundamental plan generating means 2000 generates a fundamental plan through mathematical programming or optimal programming. A mathematical programming method of planning a start/stop schedule and running load factor schedule of an equipment is detailed in the document "Optimization of Cogeneration" of the conventional technique 3, and so only the outline procedure thereof will be described.

The relationships between a steam input $QSAR_i$ and a cooling energy output $QCAR_i$ of each absorption refrigerator (symbol AR) and between the steam input $QSAR1$ and electricity $EAAR_i$ for an auxiliary equipment are approximated by the following linear expressions:

$$QCAR_i = p * QSAR_i + q * \delta AR_i \tag{1}$$

$$EAAR_i = r * QSAR_i + s * \delta AR_i \tag{2}$$

$$0 \leq \delta AR_i \leq 1 \tag{3}$$

wherein p, q, r, and s are coefficients, and i represents an equipment serial number. $\delta AR_i$ is an integer variable of 1 or 0 representing a running state ($\delta AR_i = 1$) or stop state ($\delta AR_i = 0$).

The range of steam input is given as the following constraint condition expression so as to define the minimum and maximum load factors of each equipment.

$$QS_{min} * \delta AR_i \leq QSAR_i \leq QS_{max} * \delta AR_i \tag{4}$$

where $QS_{min}$ and $QS_{max}$ represent steam input lower and upper bounds.

Similar to the expressions (1) to (4), for each boiler (symbol BL) the relationships between a gas $GAS_i$ and a steam output $QSBL_i$ and between the gas input $GAS_i$ and electricity $EABL_i$ for an auxiliary equipment, and for each electric compression refrigerator (symbol TR) the relationships between an electric input (consumption) $ETR_i$ and a cooling energy output $QCTR_i$ and between the electric input $ETR_i$ and electricity $EATR_i$ for an auxiliary equipment, are formulated.

The energy input/output can be given by the following expressions.

$$QCdem = \Sigma QCAR_i + \Sigma QCTR_i \tag{5}$$

$$QSdem + \Sigma QAAR_i = \Sigma QSBL_i \tag{6}$$

$$Ebuy = \Sigma ETR_i + \Sigma EAAR_i + \Sigma EATR_i + \Sigma EABL1 \tag{7}$$

$$Qbuy = \Sigma GAS_i \tag{8}$$

where $QCdem$ and $QSdem$ represent heating and cooling energy demands, and $Ebuy$ and $Gbuy$ represent purchased electricity and purchased gas.

An objective function f is defined in terms of input energy cost as follows.

$$f = \alpha * Ebuy + \beta * Gbuy \tag{9}$$

where $\alpha$ and $\beta$ represent energy charge unit costs of electricity and gas.

By solving the mixed integer programming problem formulated as above, the start/stop state or $\delta$ value and the load factor or input energy (e.g. $QSAR_i$) of each equipment which minimize the objective function (9) are determined.

The demands QCdem and QSdem change at each hour so that the programming problem is solved 24 times to obtain the operation fundamental plan for one day.

[3] Step 300

As a first stage of evaluating the fundamental plan obtained at Step 200, the plan evaluating means 4000 evaluates a continuous running condition of each equipment by referring to knowledge stored in the operation knowledge storage means 3000.

Generally, it is necessary to reduce the number of start/stop times of a thermal source equipment such as a boiler, generator, and refrigerator as many as possible because the equipment has a large heat capacity and the lifetime of the equipment is adversely affected by thermal stress and temperature change at the start/stop which may result in deterioration of electric insulating materials.

Figures 4A, 4B:
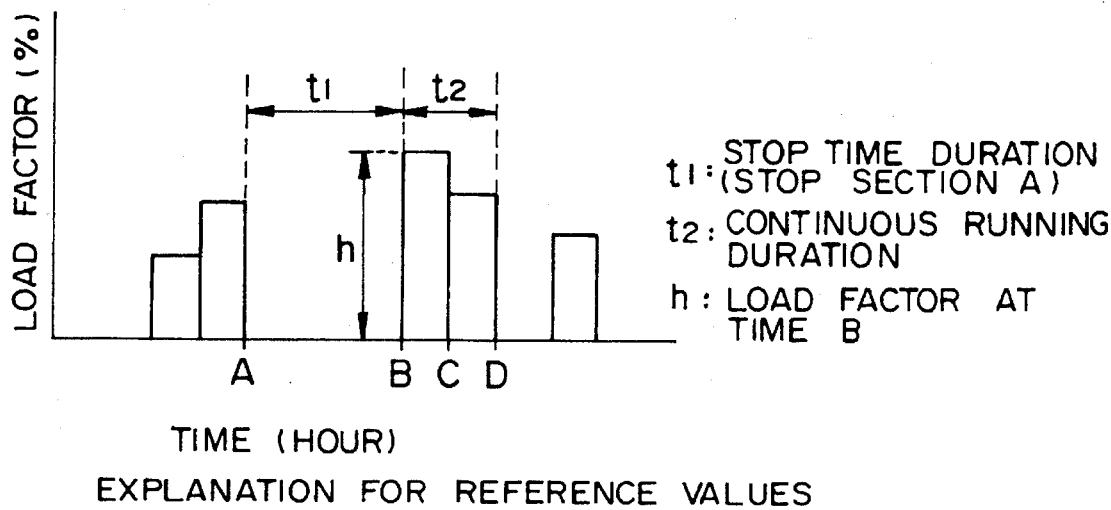
FIGS. 4A and 4B are a graph and a table showing an example of operation smoothing rules.

An example of the evaluating method will be described with reference to the schematic diagram of FIG. 4A.

Consider that an equipment under operation stops at time A, restarts at time B, and again stops at time D. The stop time duration from time A to time B is represented by t1, the operation time duration from time B to time D is represented by t2, and the load factor when the operation restarts at time B is represented by h.

The stop section in the fundamental plan for each equipment is searched and the values t1, t2, and h are calculated. In accordance with the comparison results between the calculated values and predetermined reference values, it is evaluated from operation smoothing rules illustrated in FIG. 4B whether the stop plan between time A and time B and the start plan at time B are appropriate. In FIG. 4B, S indicates that the value of t1, t2, or h is smaller than a reference value, and L indicates that the value is larger than a reference value. ON indicates a start state and OFF indicates a stop state. For example, assuming that the reference values for t1 and t2 are both two hours, if the stop time duration t1 is 5 hours and the operation time duration t2 is 1 hour, then the fundamental plan follows the rules surrounded by the bold line in FIG. 4B irrespective of the load factor h. Accordingly, the operation of 1 hour starting at time B is judged improper and the start state is changed to the stop state. Rules illustrated in FIG. 4B allow qualitative operation knowledge of skilled operators to be dealt quantitatively by knowledge engineering while considering the running load factor, In the above example, the qualitative operation knowledge corresponds to that "in the continuous running state, a short term stop is avoided as much as possible, and in the continuous running stop state, a short term operation is avoided as much as possible".

The reference values may be set for each equipment depending upon the rated capacity and performance characteristics of the equipment.

[Step 400]

In accordance with the evaluation at Step 300, the fundamental plan modifying means 600 modifies the start/stop plan by using modifying rules stored in the modifying rule storage means 5000.

In changing the stop state to the start state, the restrictive condition expression (3) is changed to $$\delta=1 \quad (10)$$

so as to forcibly designate the start state.

Similarly, in changing the start state to the stop state, it is changed to $$\delta=0 \quad (11)$$

so as to forcibly designate the stop state.

The restrictive condition at the scheduled time of an equipment whose plan is to be modified is changed to the expression (10) or (11). Thereafter, again at Step 200, the start/stop schedule and load factor schedule are calculated again by mathematical programming. The calculated results are evaluated at Step 300. The processes from Step 300 to Step 400 and to Step 200 are repeated until the start/stop plans become unnecessary to be modified, and then the process advances to Step 500.

[5] Step 500

As the second stage of evaluation, the startup characteristics which are ones of equipment dynamic characteristics are evaluated.

Figure 5A:
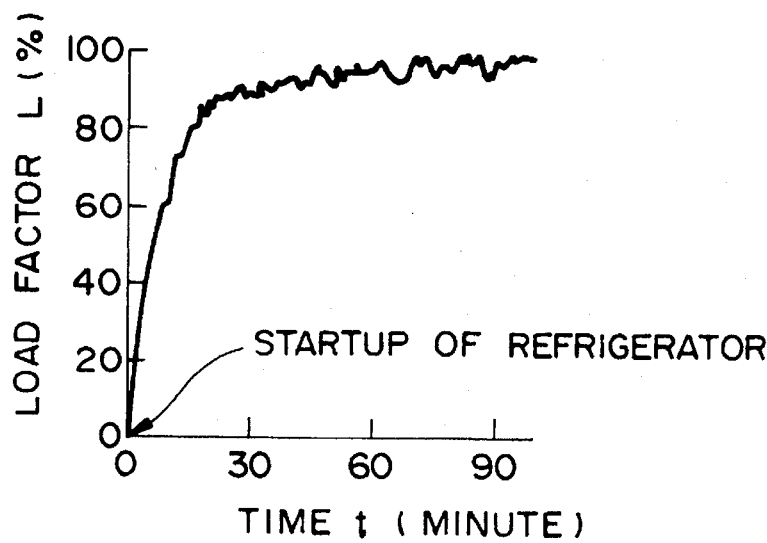
FIGS. 5A and 5B are graphs showing the startup characteristics of a steam absorption refrigerator and its startup characteristic model.
Figure 5B:
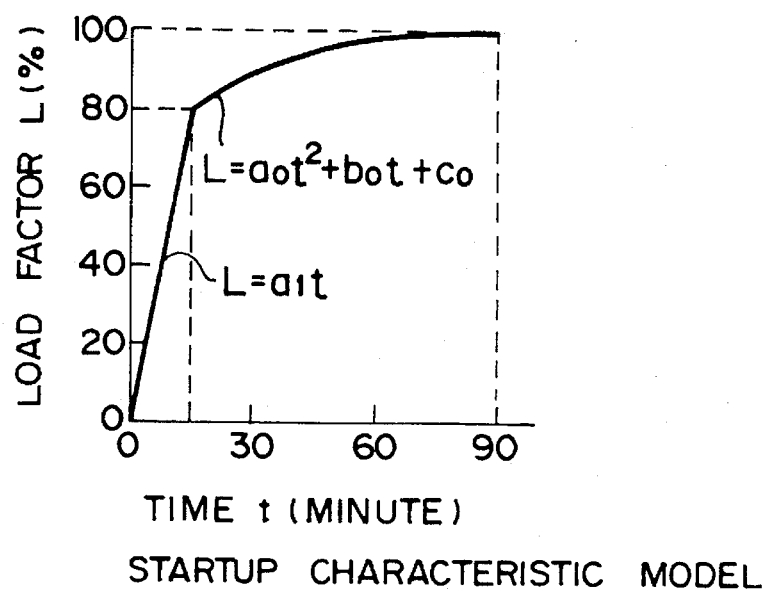

For example, in the case of a refrigerator, the load follow-up of a steam absorption refrigerator is slower than that of an electric compression refrigerator because the former uses a temperature change of absorbent and the latter uses a rotation force of an electric motor. From this reason, it is necessary to take the startup characteristics into consideration so as to obtain a practical plan. FIG. 5A illustrates an example of the startup characteristics of a steam absorption refrigerator. In this example, although an 80% output can be obtained in about 15 minutes, it takes 90 minutes to reach the rated output.

The relationship between the load factor L and time t at the startup is approximated by a combination of the following linear and quadratic expressions to obtain a startup characteristic model.

$$L=a0^* \ t(0 \leq t \leq 15) \quad (12)$$

$$L=a1^* \ t^2+b1^* \ t+c1 \ (15<t \leq 90) \quad (13)$$

where a0, a1, b1, and c1 are coefficients.

A load factor schedule is checked from the expressions (12) and (13) whether a change in the load factor is appropriate or not.

[6] Step 600

If the load factor schedule is improper relative to the startup characteristic model, the steam input lower bound QSmin in the expression (4) is changed to adjust the minimum load factor.

In determining QSmin, a minimum load factor at the preceding time period necessary for outputting the planned value of the maximum load factor is obtained from the expressions (12) and (13), and QSARi is calculated from the expression (1). This calculated value is used as QSmin.

The restrictive condition expression (4) is thus changed at the time period in concern of the equipment to be modified. The process returns to Step 200 to again calculate the start/stop schedule and load factor schedule by mathematical programming. The calculated results are again evaluated at Step 500. The processes from Step 500, Step 600, Step 200, and to Step 500 are repeated until the load factor schedule becomes unnecessary to be modified. Thereafter, the process advances to Step 700.

[7] Step 700

As the third stage of evaluation, the shutdown characteristics of an equipment are evaluated.

Figure 6A:
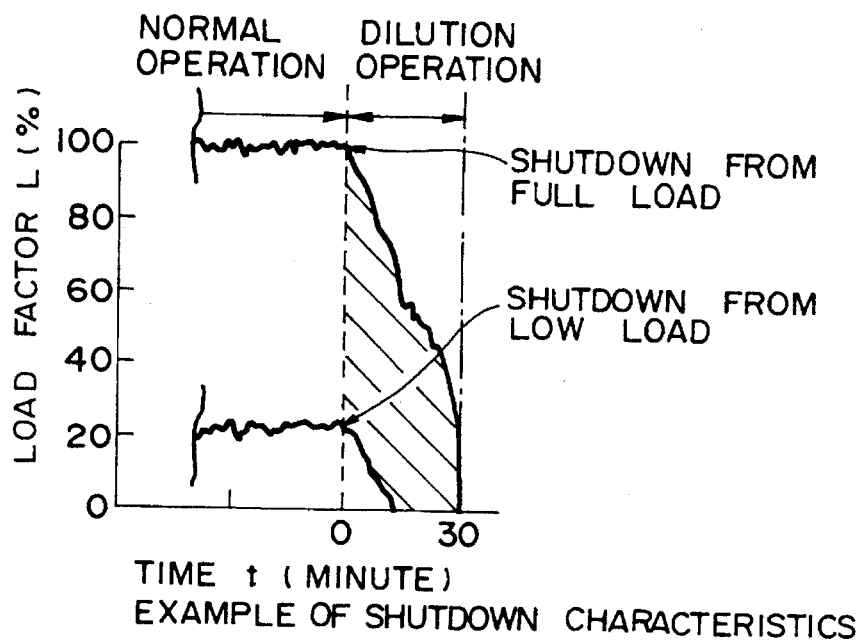
FIGS. 6A and 6B are graphs showing the shutdown characteristics of a steam absorption refrigerator and its startup characteristic model.

For example, in the case of a steam absorption refrigerator, in order to prevent crystallization of absorbent to be caused by a temperature fall when the equipment is shut down, it is necessary to sufficiently reduce the concentration of absorbent liquid before the temperature fall, i.e., a dilution operation becomes necessary. FIG. 6A illustrates an example of the shutdown characteristics of a steam absorption refrigerator. During the time period from the start of a dilution operation to the complete shutdown, residual heat corresponding to the area indicated by hatched lines in FIG. 6A is generated in correspondence with the load factor during the normal operation. It is therefore preferable to effectively use the residual heat during the dilution operation.

Figure 6B:
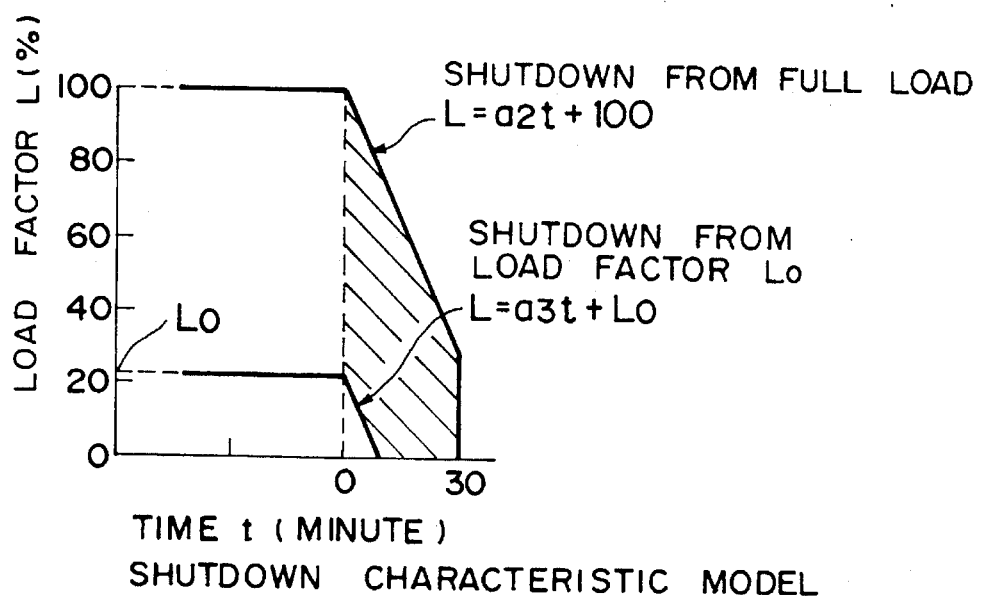

The planned schedules are checked to search a steam absorption refrigerator under a dilution operation. The amount of residual heat generated during the dilution operation is calculated by using a shutdown characteristic model shown in FIG. 6B approximated by a linear expression in terms of a load factor L0 during the normal operation.

$$L = a2 * t + L0 \tag{14}$$

[8] Step 800

A value obtained by subtracting the residual heat amount from the cooling energy demand QCdem at the time starting the dilution operation is used as a new cooling energy demand. The process returns to Step 200 to again calculate the start/stop schedule and load factor schedule by mathematical programming. The calculated results are again evaluated at Step 700. The processes from Step 700, Step 800, Step 200, and to Step 800 are repeated until all equipments under the dilution operation have been processed.

The final start/stop schedule and load factor schedule are thus generated by performing the processes [1] to [8].

Figure 7:
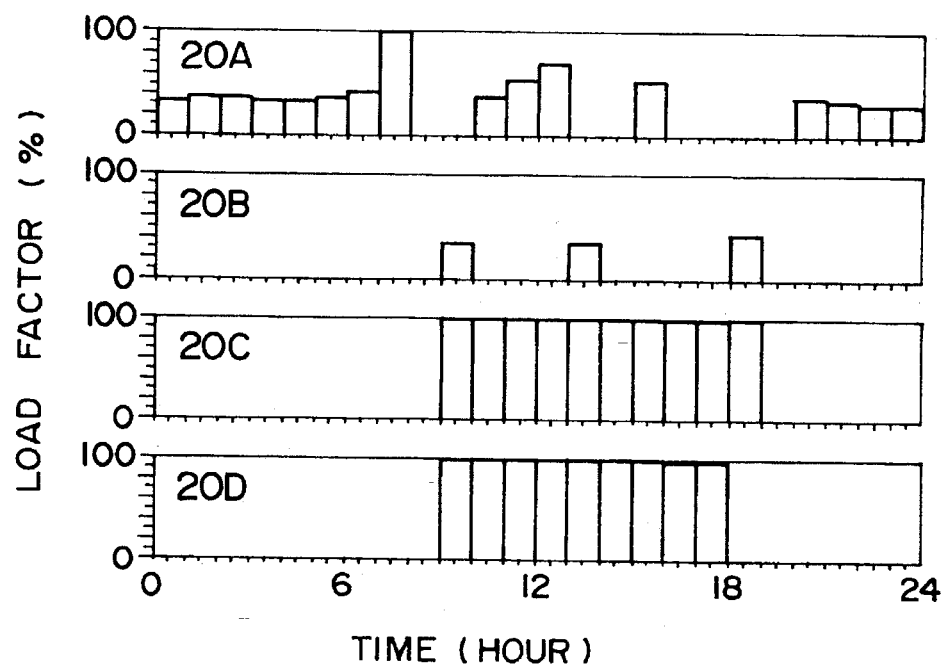
FIG. 7 shows examples of calculation results by mathematical programming.
Figure 8:
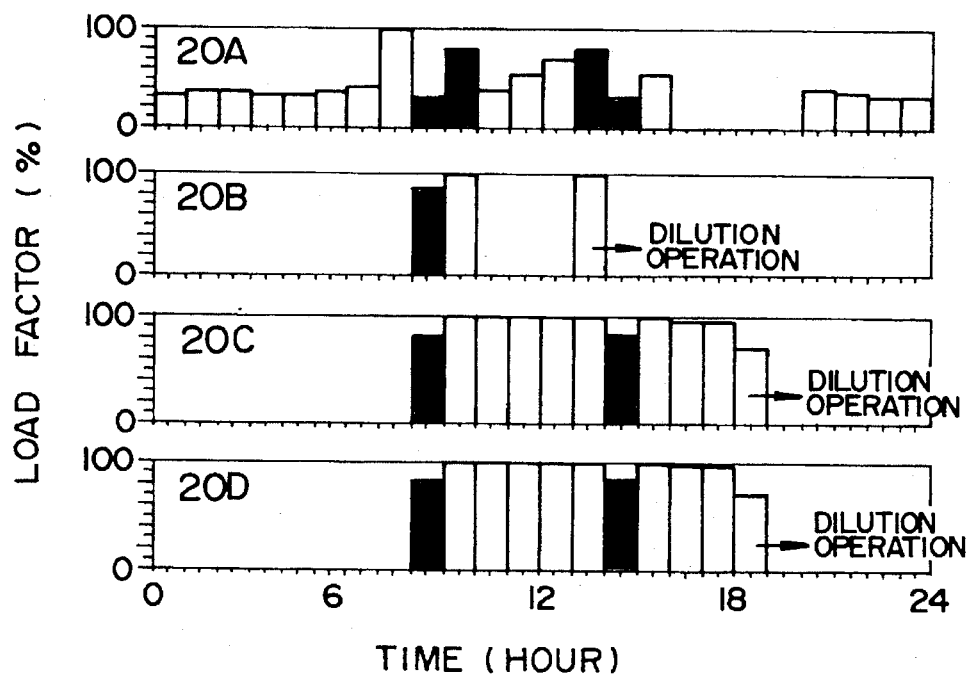
FIG. 8 shows examples of calculation results according to the present invention.

Part of the calculation results of this embodiment is illustrated in FIGS. 7 and 8.

FIG. 7 illustrates the calculation results obtained only by mathematical programming at Step 200. The steam absorption refrigerators 20A and 20B perform an intermittent running in which start and stop states are frequently repeated. The steam absorption refrigerators 20C and 20D take a planned load factor of 100% at the startup which is impossible to realize.

FIG. 8 illustrates the modified results at Steps 300, 500, and 700. In FIG. 8, black solid areas correspond modified main portions. Short term operations by the steam absorption refrigerator 20A have been removed and the refrigerator 20A performs a continuous running. In the case of the refrigerators 20B, 20C, and 20D, the start times are set one hour before in order to obtain high load factors at the designated hours. Furthermore, in order to effectively use residual heat during the dilution operation, other refrigerators are stopped and the load factors thereof are reduced.

The running cost calculated from the above example of the embodiment was reduced by about 6% as compared with a priority order method in which equipments are sequentially operated in the predetermined order.

Figure 9:
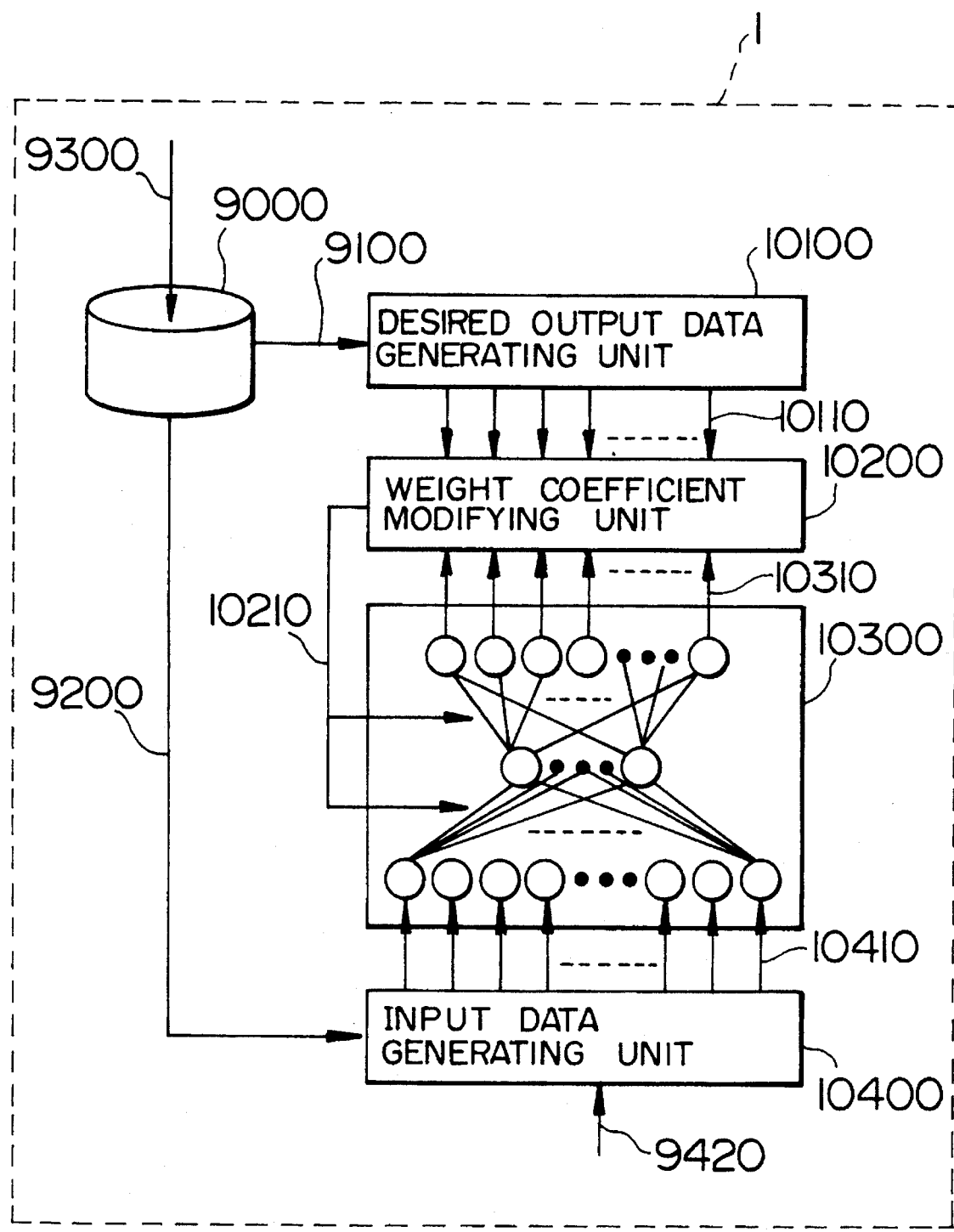
FIG. 9 is a schematic diagram of a forecasting means according to an embodiment.

FIG. 9 shows an example of a neural network used as the next day demand forecasting means 1. A demand forecasting data storage means 9000 stores input data necessary for demand forecasting, such as atmospheric temperature, humidity, weather, wind speed and direction, sunshine amount, and various event information, and stores past energy demand data 9300 to be forecast such as electricity and heat energy. The relationship between the input data and the energy demand data to be forecast is learned. The learned network is inputted with the data at the time of forecasting, and outputs forecast values.

Learning and a forecasting method will be briefly described with reference to an embodiment illustrated in FIG. 9.

(1) Making desired outputs (desired output data generating means 10100)

The past energy demand data 9100 is read from the data storage unit 9000, and if necessary, the data is transformed into an amount of change in data between predetermined hours or into a sum of data during a predetermined range of hours. The data is normalized to a value having a range of from 0 to 1 by using a predetermined representative value. In this manner, desired outputs 10110 are generated.

(2) Making inputs (input data generating means 10400)

The input data 9200 such as atmospheric temperature, humidity, and weather is read from the data storage means 9000, and if necessary, the data is transformed into an amount of change in data between predetermined hours or into a sum of data during a predetermined range of hours, or of the data the maximum value and minimum value during a predetermined range of hours are retrieved, or other processing is performed. The data is normalized by using a predetermined representative value to generate input data 10410.

(3) Signal transmission in network (neural network 10300)

The input data 10410 is applied to each neuron of an input layer of the neural network 10300, and outputted to each neuron of a hidden layer weighted by a coupling intensity between neurons, i.e., weight coefficient, optionally determined. Each hidden layer neuron transforms a sum of input signals thereto by using a transformation function such as sigmoid function. The transformed value is weighted by a weight coefficient and outputted to each neuron of an output layer. Similar to the hidden layer neuron, each output layer neuron transforms a sum of input signals thereto by using a transformation function and delivers an output value 10310.

(4) Modifying weight coefficients (weight coefficient modifying means 10200)

Weight coefficients between neurons are modified in order to reduce errors between the output values of the neural network 10300 and the desired outputs 10100.

One example of a learning method and a weight coefficient modifying method is an error backpropagation method. The details of the learning method is described in "Neurocomputer Foundations of Research", the MIT Press, 1988, pp. 674–695, and so the detailed description is omitted.

The above processes (3) and (4) are repeated by a predetermined number of times or until errors between the output values 10300 and desired values 10100 become smaller than a predetermined value, to thus complete the learning.

(5) Forecasting

The input data 9420 at the time of forecasting is applied to the neural network. In this case, output values 10310 obtained by the process (3) are the forecast values.

In the similar manner, the operation day demand forecasting means 3 can be realized. The demand forecasting method may be performed by a statistical approach such as multiple regression analysis.

It is required that given demands are as more correct as possible so as to determine a high efficient operation schedule of a thermal source equipment. By using the high precision forecasting method of this embodiment, the effects of the invention can be enhanced further.

The equipment performance characteristics, evaluating method, and modifying method of the embodiment are only illustrative. The performance characteristics and operation know-how of other thermal source equipments such as generators, heat pumps, and thermal storage tanks, and piping systems, can also be determined by using rules defined for them. By providing a means for changing the settings of equipment performance characteristics, it is possible to add or replace an equipment and to deal with a change in equipment performance characteristics.

Figure 10:
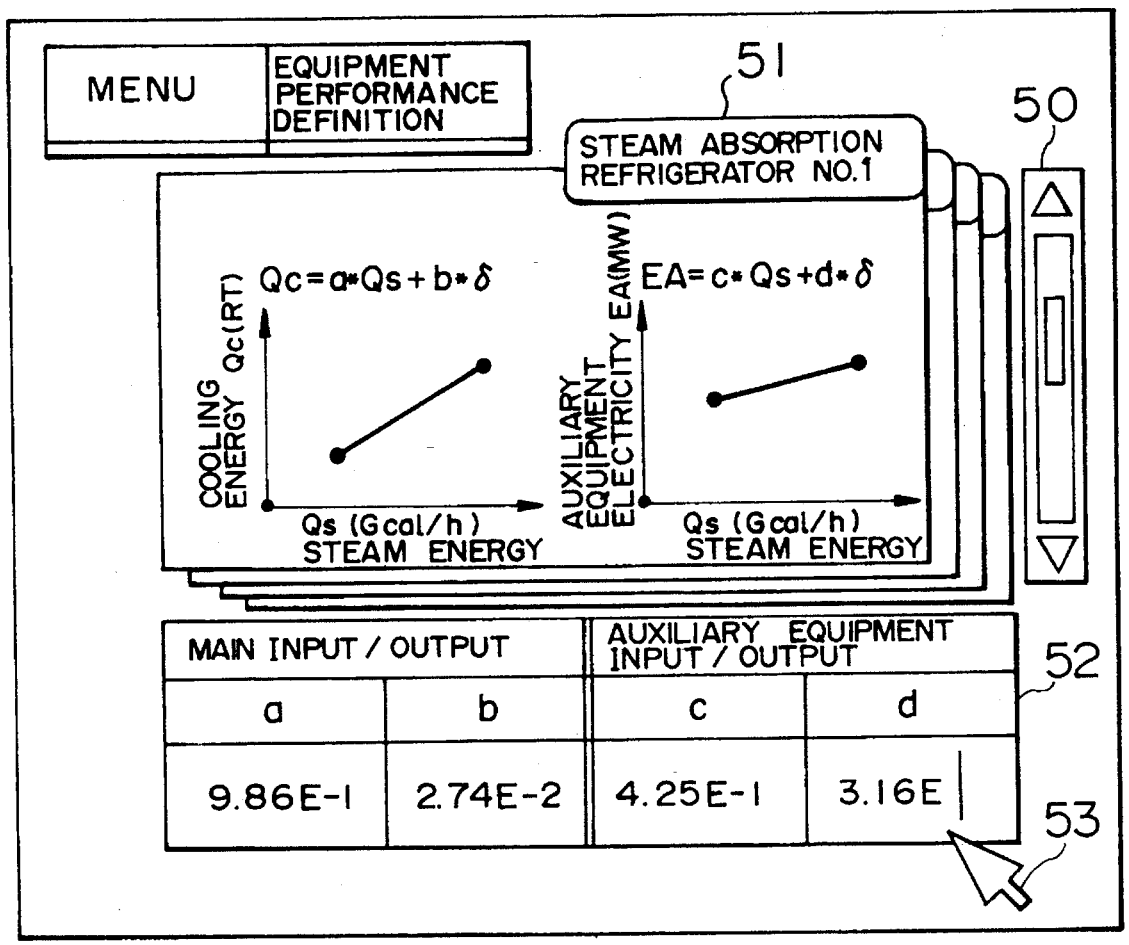
FIG. 10 shows an example of a display screen showing the settings of equipment performance characteristics.

FIG. 10 shows an example of a display screen of setting equipment performance characteristics. An equipment to be newly set or changed is selected by moving up and down a scroll bar 50. The main input/output of the selected equipment and that of an auxiliary equipment are graphically displayed on a window 51, and numerically displayed on another window 52. In changing the performance characteristic expression, a necessary coefficient (a–d) is selected from the window 52 by clicking a mouse cursor 53, and thereafter a new coefficient is entered from a keyboard. Rules representing equipment performance characteristics and know-how may be displayed to add, delete, or change rules by using an input means such as a mouse and a keyboard.

Figure 11:
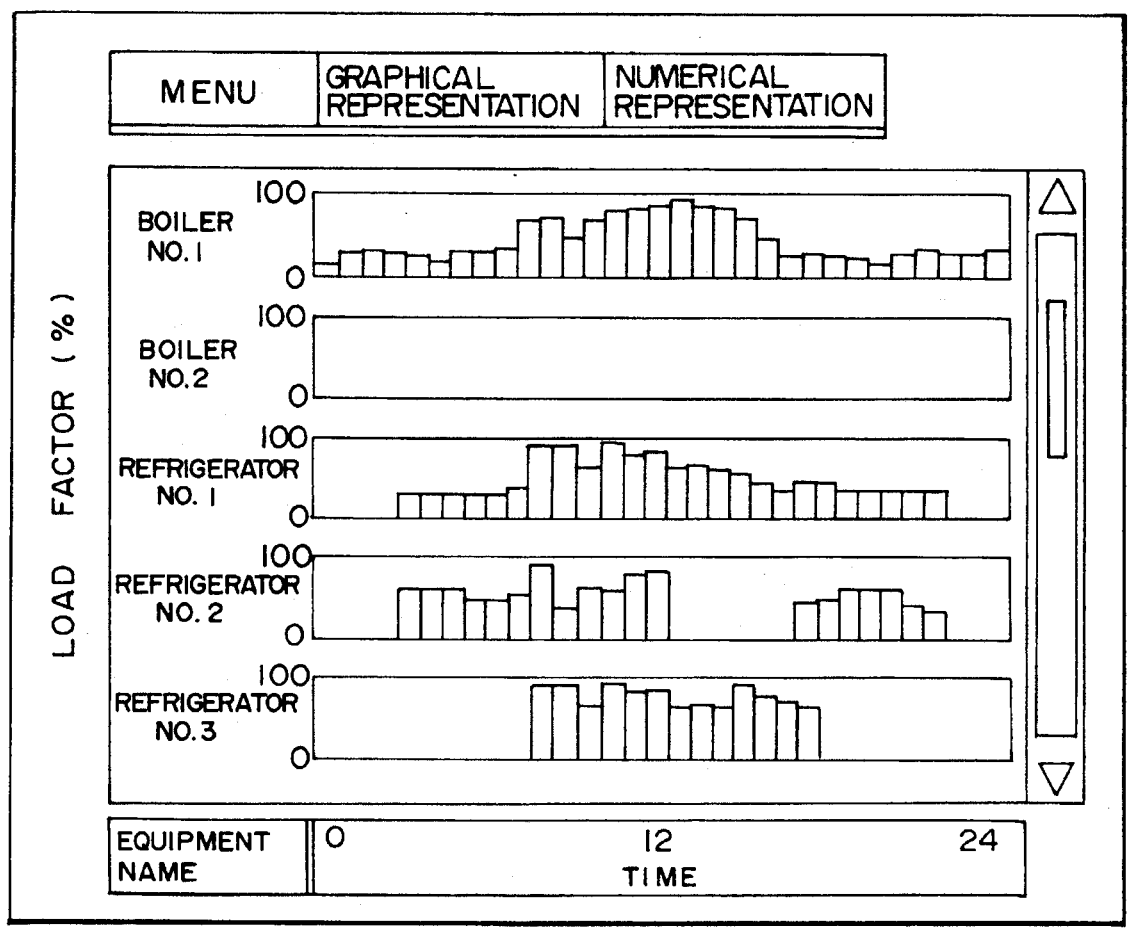
FIG. 11 shows an example of a display screen showing the results of a planned schedule.

The operation method for thermal source equipments of the invention may be used only as a guidance for operators, without using it for the direct control of equipments. FIGS. 11 and 12 show examples of display screens of calculation results. FIG. 11 is a bar graph showing the load factors of equipments relative to operating hours, and FIG. 12 shows a table of load factor values.

Rules for determining whether the results of linear programming are modified or not may be displayed on a screen to allow an operator to determine any modification.

The present invention is applicable to district heating and cooling systems, cogeneration systems, fuel cell systems, and the like.

The present invention is also applicable not only to an operation control system of an energy supply plant but also to a support system for facilitating design and to an operation simulator as an operator training means.

As described so far, according to the present invention, operating conditions difficult to be formulated, or operating conditions having an increased number of variables in formulation and taking too long a time to calculate, can be processed, thereby determining a cost effective and practical operation method at high speed.

We claim:

1. A plant operation system comprising:

input/output data storage means for storing input/output data of each equipment of a plant having a plurality of different type equipments;

fundamental operation plan generating means for generating a fundamental operation plan by reading said input/output data of each said equipment stored in said input/output data storage means and formulating said read input/output data, and by obtaining an input to each said equipment for each operation time period by using an optimal planning method, said input satisfying a target output of said plant;

rule storage means for storing knowledge rules regarding at least one of a life time and response characteristic of each said equipment;

means for evaluating said fundamental operation plan generated by said fundamental operation generating means by using said knowledge rules;

means for storing modifying rules for modifying a start/stop schedule and a load factor of each said equipment; and means for modifying said fundamental operation plan by using said modifying rules.

2. A thermal source equipment operation determining method of determining a start/stop schedule and a running load factor of an energy supply plant having a plurality of different type thermal source equipments, comprising the steps of:

formulating a relationship between input and output of each said thermal source equipment and the restrictive conditions of upper and lower bounds of said input and output, and generating said start/stop schedule and said running load factor of each said thermal source equipment by a linear planning method, said start/stop schedule and said running load factor satisfying a target output of said plant and minimizing an energy consumption cost of each said thermal source equipment and/or an exhaust amount of toxic gas to air; and modifying said start/stop schedule and said running load factor of each said thermal source equipment, by using knowledge rules regarding a life time and an output response characteristic of each said thermal source equipment.

3. A thermal source equipment operation determining method according to claim 2, wherein optimization of said start/stop schedule and said running load factor of each said thermal source equipment is evaluated by using said knowledge rules, in accordance with said evaluated results said restrictive conditions used for the execution of said linear planning method are changed, optimization calculation by said linear planning method is again performed, and said start/stop schedule and said running load factor of each said thermal source equipment are modified.

4. A thermal source equipment operation determining method according to claim 2, wherein as a method of evaluating optimization of said start/stop schedule and said running load factor of each said thermal source equipment, a stop time duration from when each said thermal source equipment is stopped and to when each said thermal source equipment is re-started, a load factor at the time of re-start, and an operation time duration from the time of re-start to the time of re-stop are compared with predetermined respective reference values, and in accordance with the comparison results with said reference values appropriateness of said start/stop schedule of each said thermal source equipment is judged.

5. A thermal source equipment operation determining method according to claim 2, wherein a steam absorption refrigerator is used as each said thermal source equipment, and as a method of evaluating optimization of and modifying said start/stop schedule and said running load factor of each said thermal source equipment, a dilution operation start time and a necessary dilution operation time duration of each said steam absorption refrigerator are detected, and said load factors of cooling and heating energy output equipments other than said equipment under said dilution operation are lowered so as to reduce a sum of output energies of said cooling and heating energy output equipments in the range equal to or less than the cooling energy generated by said equipment during said dilution operation.

6. A thermal source equipment operation determining method according to claim 2, wherein said output of each said thermal source equipment is forecast in accordance with past operation data.

7. A thermal source equipment operation determining method according to claim 6, wherein in forecasting said output of each said thermal source equipment, a neural network using said past operation data is used.

8. A thermal source equipment operation determining system of determining a start/stop schedule and a running load factor for a plurality of different type thermal source equipments, comprising:

means for formulating a relationship between input and output of each said thermal source equipment and the restrictive conditions of upper and lower bounds of said input or output, and generating said start/stop schedule and said running load factor of each said thermal source equipment by a linear planning method, said start/stop schedule and said running load factor minimizing an energy consumption cost of each said thermal source equipment;

operation rule storage means for storing knowledge rules regarding a life time and output response characteristic of each said thermal source equipment;

fundamental operation plan evaluating means for evaluating optimization of said fundamental operation plan by using said knowledge rules stored in said operation rule storage means;

modifying rule storage means for storing modifying rules for modifying said start/stop schedule and said running load factor of each said thermal source equipment in accordance with said fundamental operation plan evaluation results; and means for modifying said fundamental operation plan in accordance with said modifying rules.

9. An energy supply plant operation control system including the thermal source equipment operation determining system set forth in claim 8, comprising means for displaying at least one of a set of said start/stop schedule and said running load factor of each said thermal source equipment, and a set of knowledge regarding a life time and output response characteristic of each said thermal source equipment.

10. An energy supply plant operation control system including the thermal source equipment operation determining system set forth in claim 8, comprising means for adding, deleting, or modifying knowledge regarding a life time and output response characteristic of each said thermal source equipment.

11. An energy supply plant operation control system including the thermal source equipment operation determining system set forth in claim 8, comprising means for displaying knowledge rules regarding a life time and output response characteristic of each said thermal source equipment on a display screen, and adding, deleting, or modifying said knowledge rules by designating with input means including a keyboard, a mouse, a light pen, and the like.

12. An energy supply plant operation control system including the thermal source equipment operation determining system set forth in claim 8, comprising means for displaying a relationship expression of input and output of each said thermal source equipment and a restrictive condition expression for upper and lower bounds of said input on a display screen, and adding, deleting, or modifying said relationship expression and said restrictive condition expression by designating with input means including a keyboard, a mouse, a light pen, and the like.

13. An energy supply plant operation control system including the thermal source equipment operation determining system set forth in claim 8, comprising means for displaying said modifying rules used for modifying said start/stop schedule and said running load factor of each said thermal source equipment generated by said linear planning method, on a display screen.

14. An energy supply plant operation control system including the thermal source equipment operation determining system set forth in claim 8, comprising means for displaying said modifying rules used for modifying said start/stop schedule and said running load factor of each said thermal source equipment generated by said linear planning method, on a display screen, and determining whether said modifying rules are to be modified or not by designating with input means including a keyboard, a mouse, a light pen, and the like.

15. An energy supply plant operation system comprising:

long term demand forecasting means for forecasting an energy demand up to a predetermined period;

operation plan generating means for determining a start/stop schedule and a running load factor of each thermal source equipment of said energy supply plant up to said predetermined period by using the forecast results by said long term demand forecasting means;

short term demand forecasting means for forecasting an energy demand during a short period shorter than said predetermined period; and plan modifying and controlling means for modifying the whole or part of said start/stop schedule and said running load factor of each said thermal source equipment by using the forecast results by said short term demand forecasting means, and converting the modified results into a control signal for each said thermal source equipment, wherein said operation plan generating means is the thermal source equipment operation determining system set forth in claim 8.

16. An operation method for a plant having a plurality of equipment of different types, comprising the steps of:

generating a fundamental operation plan by reading a past record of input data and output data for each said equipment from a database to formulate a relationship therebetween, and providing a constraint condition expression for determining an upper bound and a lower bound for an input or an output in the relationship formulated, to obtain, at every operation time period, an input or an output of each of said equipments making a value of a predetermined objective function maximum or minimum, while satisfying a target output of said plant; and making rules of knowledge regarding lifetime and knowledge regarding a response characteristic of each said equipment, to modify at least one of the upper bound and the lower bound of the constraint condition expression on the basis of the rules, to obtain again an input or an output of each said equipment making a value of the predetermined objective function maximum or minimum.

* * * * *